United States Patent [19]

Hess et al.

[11] 3,844,891

[45] Oct. 29, 1974

[54] FLOWABLE PANCREATIN PREPARATION OF LOW GERM CONTENT, AND A PROCESS FOR ITS MANUFACTURE

[75] Inventors: Hans Hess, Binningen; Guenther Mueller, Arlesheim, both of Switzerland; Horst Stolte, Wehr, Baden, Germany

[73] Assignee: Ciba-Geigy Corporation, Ardsley, N.Y.

[22] Filed: July 19, 1971

[21] Appl. No.: 164,052

[30] Foreign Application Priority Data
July 23, 1970   Switzerland........................ 11170/70

[52] U.S. Cl.................. 195/68, 195/63, 195/66 R, 195/123
[51] Int. Cl............................................. C07g 7/02
[58] Field of Search.......... 195/66 R, 121, 122, 123, 195/65, 62; 99/211; 424/94, 351, 331

[56] References Cited
UNITED STATES PATENTS

| | | | |
|---|---|---|---|
| 2,503,313 | 4/1950 | Levin | 195/65 |
| 2,922,749 | 1/1960 | Snyder et al. | 195/66 |

OTHER PUBLICATIONS

S. H. Hunter and Clara A. Bjerknes, Proc. Soc. Exper. Biol. and Med., March 1948, pgs. 393–397.

Primary Examiner—A. Louis Monacell
Assistant Examiner—Thomas Wiseman
Attorney, Agent, or Firm—Joseph G. Kolodny; Ronald A. Daignault

[57]   ABSTRACT

A well flowable pancreatin preparation of low germ content, which displays a practically unchanged enzyme activity in comparison to unpurified pancreatin and a process for preparing same.

10 Claims, No Drawings

FLOWABLE PANCREATIN PREPARATION OF LOW GERM CONTENT, AND A PROCESS FOR ITS MANUFACTURE

The subject of the invention is a flowable pancreatin preparation of low germ content, which displays a practically unchanged enzyme activity in comparison to unpurified pancreatin, and a process for its manufacture.

Pancreatin is known to be an enzyme system which is isolated from the pancreas. Its enzyme activity is composed of an amylase component, a lipase component, and a trypsin and chymotrypsin (proteolytic) component. Sensitive extracts of organs, thus also including pancreatin, are in most cases contaminated with pathogenic germs which are already present in the organic material to be extracted, or become contaminated during manufacture. For using the extracts for humans, however, it should not be possible to detect any enterobacteria and pseudomonades (in 1 g) and salmonellae (in 10 g). Furthermore the total germ count should not be greater than 10,000/g. Numerous commercial preparations however show that these requirements with respect to contamination can barely be observed if the preparation is at the same time to possess a high enzyme activity. This is occasioned through the very sensitive enzyme system, which is for example at least partially destroyed on customary sterilization with heat or with ethylene oxide, but also by irradiation. Finally, commercial preparations show little flow, that is to say they show a poor technological behaviour with respect to further processing into solid forms for administration.

It has now been found that a pancreatin preparation of low germ content which at the same time shows good flow and which has unchanged enzyme activity can be obtained if a contaminated pancreatin preparation is worked into a plastic mass with an aqueous solution or, where appropriate, a stabilized emulsion of a lower aliphatic ketone, preferably having 3-6 carbon atoms, above all butan-2-one, or of a halogenated hydrocarbon having a boiling point of between 15° and 100° C, especially 30°–60 ° C, above all methylene chloride or chloroform, optionally in the presence of a thickener, and this composition is dried, in the comminuted state, at a temperature below 40° C. Granules of low germ content are thus obtained, which show excellent flow properties and can easily be converted into solid forms for administration, such as tablets, dragees and the like.

To carry out the process, an aqueous solution or an emulsion of the ketone or of the halogenated hydrocarbon is first produced, advantageously containing about 10–25 percent of water. In doing so, a cellulose derivative, especially methylhydroxypropylcellulose or ethylhydroxypropylcellulose, for example "Klucel" or "Methocel HG 60" is appropriately used for stabilization or as a thickener, in an amount of advantageously 2–10 percent, preferably about 3 percent. This solution or emulsion is added to the enzyme preparation, so that the mixture contains about 10–30 percent, preferably 10–15 percent, of water relative to the enzyme, and the mixture is processed in the usual manner, for example by kneading or intensive mixing, until a homogeneous, plastic mass is produced. This is then comminuted in the customary manner, for example forced or beaten through a sieve, and dried in a stream of air. The granules thus obtained are, if necessary or desired, further comminuted, for example by grinding.

A further subject of the invention is the flowable pancreatin preparation of low germ content, obtainable according to the process, which shows an unchanged enzyme activity compared to unpurified pancreatin, especially a preparation with an amylase activity of over $3 \times 10^7$ m.i.u./g, a lipase activity of over 400,000 m.i.u./g and a trypsin and chymotrypsin activity (proteolytic activity) of conjointly over 25,000 m.i.u./g, and in which fewer than 10 enterobacteria are detectable in 1 g and no salmonellae are detectable in 10 g, and which displays a total germ count of less than 10,000 per gram.

The invention is described in more detail in the examples which follow, without being restricted in any way.

EXAMPLE 1

100 kg of chloroform are treated with 3 kg of hydroxypropylcellulose-ether. An emulsion is manufactured by adding 20 kg of water.

150 kg of pancreatin are processed with this emulsion in an appropriate kneader or mixer to give a plastic mass which can be granulated. The moist granules are dried at a temperature of <40° C and an atmospheric humidity of <25 percent and are, if necessary, brought to the desired particle size by grinding.

EXAMPLE 2

4 kg of ethylhydroxyethylcellulose are suspended in 120 kg of methylene chloride and emulsified with 25 kg of water.

150 kg of pancreatin are processed with this emulsion in an appropriate kneader or mixer to give a plastic mass which can be granulated. The moist granules are dried at a temperature of <40° C and an atmospheric humidity of <25 percent and are, if necessary, brought to the desired particle size by grinding.

EXAMPLE 3

2.5 kg of methylhydroxypropylcellulose are dissolved in 80 kg of acetone and 20 kg of water.

150 kg of pancreatin are processed with this emulsion in an appropriate kneader or mixer to give a plastic mass which can be granulated. The moist granules are dried at a temperature of <40° C and an atmospheric humidity of <25 percent and are, if necessary, brought to the desired particle size by grinding.

EXAMPLE 4

3 kg of methylhydroxypropylcellulose are suspended in 100 litres of methylene chloride and emulsified with 20 litres of water. Further processing with 150 kg of pancreatin takes place as under example 1.

We claim:

1. Process for preparing a free flowing pancreatin preparation of low germ content less than 10,000/g, which displays a practically unchanged enzyme activity in comparison to unpurified pancreatin, comprising, working a pancreatin preparation contaminated with pathogenic germs into a plastic mass with an aqueous solution or a stabilized emulsion of a lower aliphatic ketone having 3 to 6 carbon atoms or a halogenated hydrocarbon having a boiling point of between 30°–60° C, drying the plastic mass in a stream of air, and comminuting the dried mass at a temperature below 40° C.

2. Process as claimed in claim 1, wherein methylene chloride or chloroform is used.

3. Process as claimed in claim 1, wherein butane-2-one is used.

4. Process as claimed in claim 1, wherein a stabilized emulsion or a solution is used containing 10 to 25 percent of water.

5. Process as claimed in claim 4, wherein the emulsion or the solution contains for stabilization or as thickener a cellulose derivative.

6. Process as claimed in claim 5, wherein as a cellulose derivative methylhydroxypropylcellulose or ethylhydroxypropylcellulose is used.

7. Process as claimed in claim 4, wherein the stabilized emulsion or solution contains the cellulose derivative in an amount of 2 to 10 percent.

8. Process as claimed in claim 7, wherein the stabilized emulsion or solution contains the cellulose derivative in an amount of 3 percent.

9. Process as claimed in claim 1, wherein the contaminated pancreation is added to the emulsion or solution so that the mixture contains 10 to 30 percent of water relative to the enzyme.

10. Process as claimed in claim 9, wherein the mixture contains 10 to 15 percent of water relative to the enzyme.

* * * * *